United States Patent [19]
Durazzani

[11] Patent Number: 5,965,236
[45] Date of Patent: Oct. 12, 1999

[54] INJECTION MOLDED PLASTIC PARTS AND METHOD OF FORMING

[75] Inventor: Piero Durazzani, Porcia, Italy

[73] Assignee: Electrolux Zanussi Elettrodomestici S.p.A., Pordenone, Italy

[21] Appl. No.: 08/929,631

[22] Filed: Sep. 15, 1997

[30] Foreign Application Priority Data

Oct. 8, 1996 [IT] Italy ................... PN96A0056

[51] Int. Cl.$^6$ ............... B32B 3/00; D06F 1/02; B29B 7/00
[52] U.S. Cl. .......... 428/156; 428/120; 428/167; 428/180; 428/213; 264/328.1; 68/232
[58] Field of Search ................. 428/156, 178, 428/116, 120, 131, 167, 180, 213; 264/241, 328.1, 297.2, 284; 68/12.01, 140, 232

[56] References Cited

U.S. PATENT DOCUMENTS

| | | | |
|---|---|---|---|
| 4,816,316 | 3/1989 | Robbins | 428/167 |
| 5,329,791 | 7/1994 | Cargnel et al. | 68/24 |

FOREIGN PATENT DOCUMENTS

| | | |
|---|---|---|
| 601347 | 6/1994 | European Pat. Off. . |
| 25 40 519 | 3/1997 | Germany . |
| 58-059826 | 9/1983 | Japan . |
| 04187358 | 6/1992 | Japan . |
| 08080547 | 3/1996 | Japan . |

*Primary Examiner*—Donald Loney
*Attorney, Agent, or Firm*—Pearne, Gordon, McCoy & Granger LLP

[57] ABSTRACT

A large-sized and heavy part (1) of plastic material is injection molded. Localized zones are created in which the thermal conductance of the part (1) is higher in the surface impressions (10) at the mold ejectors for the removal of the part after it has been molded. In a preferred embodiment, the outer surface of the part (1) has, at the surface impressions (10), clusters of closed-bottom pits (13) formed by grids of mini-ribs (11) and (12) arranged perpendicularly with respect to each other. The thickness of the part varies from a maximum value (S1) at the periphery of the cavity to a minimum value (S2) at the bottom of a substantial number of the pits (13).

12 Claims, 2 Drawing Sheets

INJECTION MOLDED PLASTIC PARTS AND METHOD OF FORMING

BACKGROUND OF THE INVENTION

The present invention relates to an improved method for injection-molding parts of plastic materials. In particular, the present invention relates to the production of parts having large dimensions and heavy weight such as the wash tubs of household clothes washing machines, for example the type disclosed in EP 0 601 347 and U.S. Pat. No. 5,329,791.

When production volumes of molded parts are increased, increasing the number of injection molding presses for coping with such volumes would require considerable amounts of money to be invested. To avoid such an increase it would be desirable for the dwelling time of the molded parts in the respective mold to be made as short as possible. The fulfillment of such a requirement is opposed however, in the case of particularly large and heavy parts, by the speed at which the plastic material cools down after injection. The need in fact arises for the ejectors provided in the mold, which exert a localized pressure on the surface of the molded part in view of knocking it out of the mold, to be prevented from deforming it or breaking through it when the plastic material is not sufficiently stiff yet.

BRIEF SUMMARY OF THE INVENTION

It is therefore a main purpose of the present invention to reduce, in a simple, reliable and safe manner, the dwelling time of molded plastic parts, particularly those having a large size and a heavy weight, in the respective injection mold, thereby avoiding the need for expensive investments. The characteristics of the present invention are as recited in the appended claims.

BRIEF DESCRIPTION OF THE SEVERAL VIEWS OF THE DRAWINGS

The features and advantages of the present invention will anyway be more readily understood from the description of a preferred embodiment thereof which is given below by way of non-limiting example with reference to the accompanying drawings, in which.

DESCRIPTION OF THE INVENTION

Figure 1:
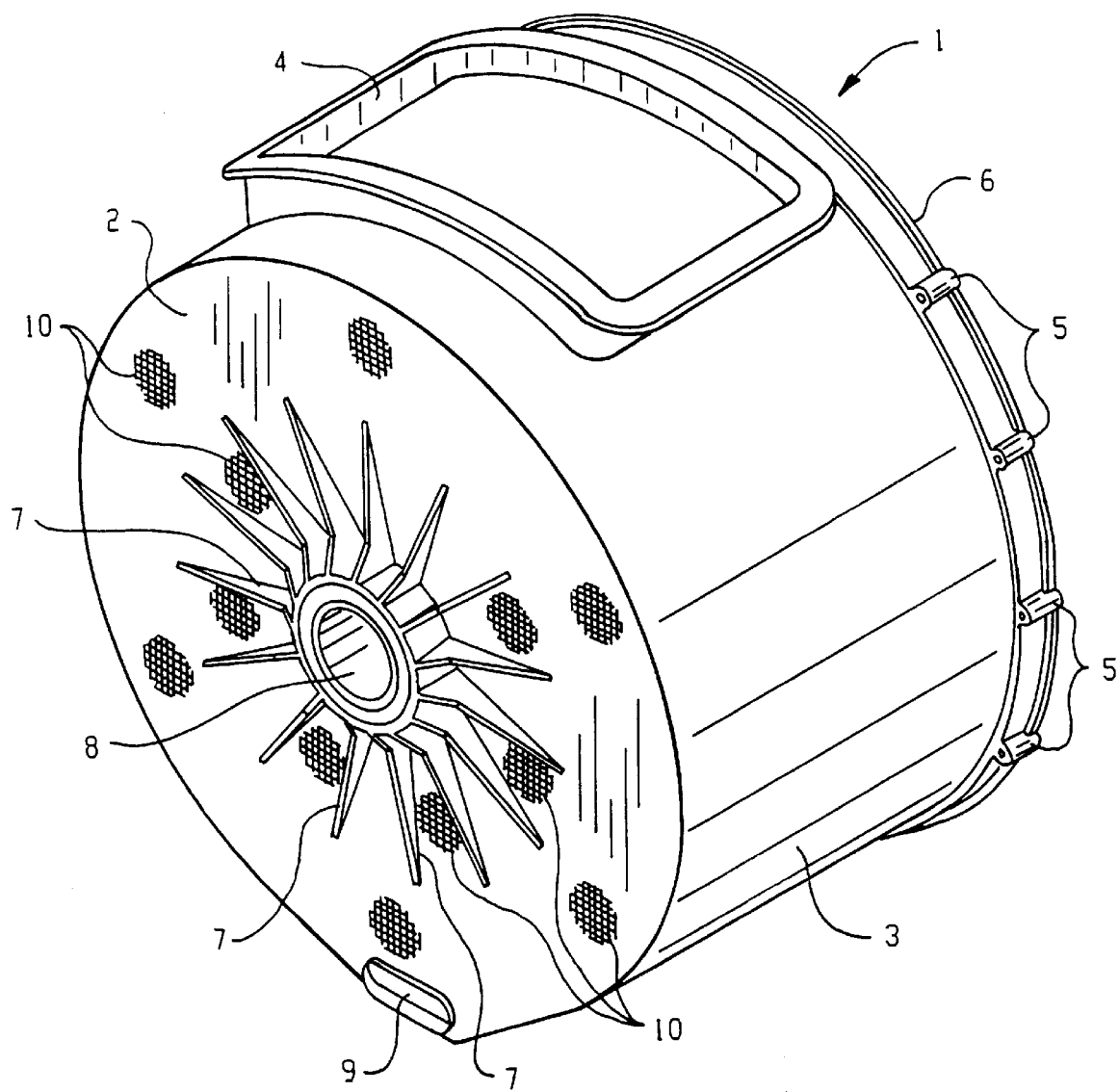
FIG. 1 is a simplified perspective view of a wash tub for a top-loading clothes washing machine.

Referring to FIG. 1, a molded part, such as wash tub 1, is made of a plastic material (polypropylene filled with calcium carbonate and/or fiberglass) by an injection molding process. The tub 1 is used for a top-loading clothes washing machine and comprises a single-piece part. The single-piece tub 1 includes a rear-end disk-shaped wall 2 and a cylindrical mantle 3. The cylindrical mantle 3 is provided with a flanged hopper-like arrangement 4 for loading and unloading the washload and is removably fixed by means of a plurality of screws (not shown) that are adapted to engage corresponding seats 5 that are provided integrally along the flanged front periphery 6 thereof, to a front-end disk-shaped wall (not shown) of the tub.

The rear-end wall 2 of the tub is provided with a plurality of radially extending ribs 7 that are angularly spaced at equal intervals from each other, starting from a circular through-opening 8 provided to retain the support means for the shaft of the rotating drum. At the extreme lower periphery of the rear-end wall 2, a second through-opening 9 is provided for the assembly of a heating element for heating up the washing liquid in the tub. On the outer surface of the tub 1, namely on the surface of the rear-end wall 2, there are provided, distributed according to a rational pattern, a plurality of circular plane impressions (10) at the positions on which the ejectors provided in the mold exert their pressure for ejecting tub 1 from the mold after the tub 1 has been molded. The impressions 10 are substantially circular in their shape and may have a diameter of up to a few tens of millimeters.

In localized zones at the impressions 10, the thermal conductance of the tub 1 is higher than in other zones of the tub.

Figure 2:
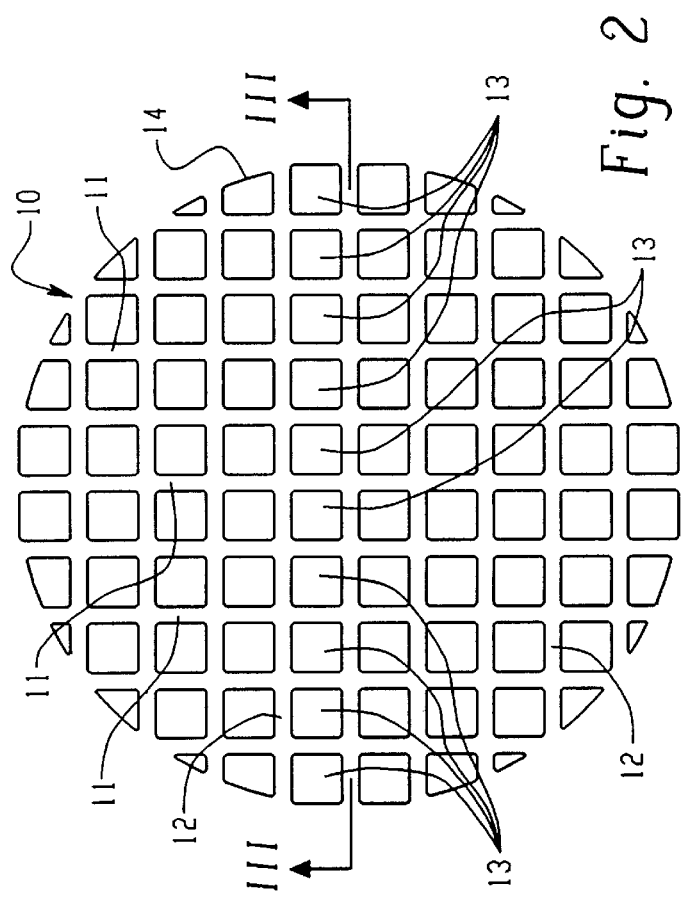
FIG. 2 is a front, enlarged-scale view of an impression in FIG. 1.
Figure 3:
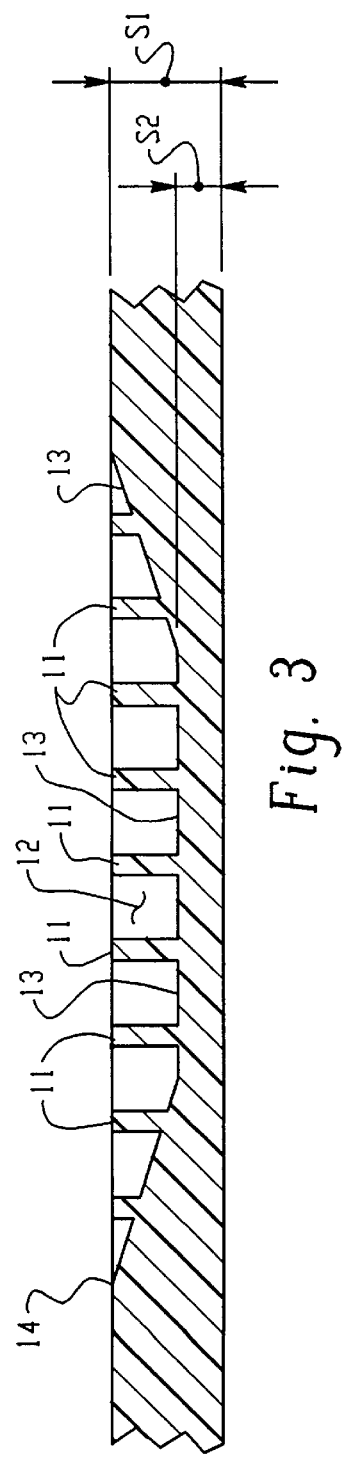
FIG. 3 is a cross-sectional view, in enlarged scale, of the impression along the III—III plane of FIG. 2.

Referring to FIGS. 2 and 3, the mold used to produce the tub or other part in question, is made such that, at each such impression 10, the outer surface of the rear-end wall 2 is provided with clusters of closed-bottom pits 13 formed by grids of mini-ribs 11 and 12 extending perpendicularly to each other. The thickness of the rear-end wall 2 of the tub at the periphery 14 of each such cluster of pits, ie. each impression 10, decreases towards the inner portion of the same impression 10. The wall thickness varies from a maximum value S1 down to a minimum value S2 (FIG. 3). The minimum value is located at the bottom of a substantial number of the pits 13, and is preferably between approximately 15 percent and approximately 70 percent of said maximum value S1.

The presence of the grids of mini-ribs 11 and 12 forming the pits 13, along with the reduction from S1 to S2 of the wall thickness, favors the rapid stiffening of the impressions of the tub 1 in the mold, ie. at the ejectors, due to quicker cooling. Faster cooling permits earlier ejection without risk of damaging the tub 1. The advantage of higher output rates is in this way obtained without any need arising to have resort to significant industrial investments in the purchase of new molds and/or equipment to correspondingly increase injection-molding capacity.

The possibility also exist for an existing mold to be "retrofitted" for performing the related process for injection-molding the plastic part involved, ie., modified correspondingly to accommodate the improvement according to the teachings of the present invention, to quickly, and with minimal additional costs, cope with sudden significant variations in demand.

It will be appreciated that the principles of the present invention may be implemented by those skilled in the art even in manners that differ from the above described one, as well as for producing other parts than wash tubs for clothes washing machine. In particular, the localized zones with a higher thermal conductance of a molded part may be obtained by solely relying upon a localized reduction in thickness or locally inserting in the plastic mass a small plate or disk made of an appropriate metal material, which is capable of easily dissipating the heat accumulated in the plastic material during molding in the zones that are situated in correspondence of the mold ejectors.

What is claimed is:

1. An improved injection molded part (1) made of plastic material, comprising a plurality of surface impressions (10) at locations at which part ejectors provided in the mold exert pressure for ejecting the part after the part has been molded, characterized in that a thermal conductance of the part (1) is higher at said impressions (10) than in other zones of the part.

2. A part according to claim 1, characterized in that said part (1) has a thickness that decreases from a maximum value (S1) at a periphery (14) of each impression (10) to a minimum value (S2) inside the same impression (10).

3. A part according to claim 2, characterized in that said minimum value (S2) of the thickness of the part (1) is between approximately 15 percent and approximately 70 percent of said maximum value (S1).

4. A part according to claim 3, characterized in that said impressions (10) include clusters of closed-bottom pits (13) formed by grids of mini-ribs (11) and (12) extending perpendicularly to each other on an outer surface of said part (1), the thickness of the part (1) having said minimum value (S2) thereof at the bottom of a substantial number of said pits (13).

5. A part according to claim 2, characterized in that said impressions (10) include clusters of closed-bottom pits (13) formed by grids of mini-ribs (11) and (12) extending perpendicularly to each other on an outer surface of said part (1), the thickness of the part (1) having said minimum value (S2) thereof at the bottom of a substantial number of said pits (13).

6. A part according to any of the preceding claims, characterized in that each impression (10) is substantially circular.

7. A part according to any of claims 1 to 5, characterized in that the part is a wash tub for a clothes washing machine.

8. An improved method of injection molding a part made of plastic material comprising the steps of:

injecting molten plastic into a mold to form the part;

forming surface impressions in the part wherein the surface impressions have a higher thermal conductance than other zones of the part; and ejecting the part from the mold by exerting pressure at the surface impressions with a part ejector.

9. A method according to claim 8 wherein ejection occurs after the impressions have hardened and before the other zones of the part have hardened.

10. A method according to claim 8, characterized in that said part (1) is formed with a thickness that decreases from a maximum value (S1) at a periphery (14) of each impression (10) to a minimum value (S2) inside the same impression (10).

11. A method according to claim 10, characterized in that said minimum value (S2) of the thickness of the part (1) is between approximately 15 percent and approximately 70 percent of said maximum value (S1).

12. A method according to claim 11, characterized in that said impressions (10) are formed with clusters of closed-bottom pits (13) formed by grids of mini-ribs (11) and (12) extending perpendicularly to each other on an outer surface of said part (1), the thickness of the part (1) having said minimum value (S2) thereof at the bottom of a substantial number of said pits (13).

* * * * *